(12) United States Patent
Fenton et al.

(10) Patent No.: US 11,667,303 B2
(45) Date of Patent: Jun. 6, 2023

(54) HANDS-OFF DETECTION FOR AUTONOMOUS AND PARTIALLY AUTONOMOUS VEHICLES

(71) Applicant: Robert Bosch GmbH, Stuttgart (DE)

(72) Inventors: Matthew James Fenton, Milford, MI (US); Trevor J. Nill, Macomb, MI (US)

(73) Assignee: Robert Bosch GmbH, Stuttgart (DE)

( * ) Notice: Subject to any disclaimer, the term of this patent is extended or adjusted under 35 U.S.C. 154(b) by 36 days.

(21) Appl. No.: 17/517,016

(22) Filed: Nov. 2, 2021

(65) Prior Publication Data
US 2023/0137294 A1   May 4, 2023

(51) Int. Cl.
*B60W 50/00* (2006.01)
*B60W 50/029* (2012.01)
*G07C 5/08* (2006.01)

(52) U.S. Cl.
CPC .......... *B60W 50/029* (2013.01); *G07C 5/085* (2013.01); *B60W 2050/0028* (2013.01)

(58) Field of Classification Search
CPC ........ B60W 50/029; B60W 2050/0028; G07C 5/085
See application file for complete search history.

(56) References Cited

U.S. PATENT DOCUMENTS

| | | | |
|---|---|---|---|
| 9,262,307 B2 | 2/2016 | Segall et al. | |
| 9,886,117 B2 | 2/2018 | Karasawa et al. | |
| 10,160,484 B2 | 12/2018 | Lee et al. | |
| 2009/0313639 A1* | 12/2009 | Davis | G06F 11/3006 719/317 |
| 2010/0228417 A1 | 9/2010 | Lee et al. | |
| 2013/0090911 A1 | 4/2013 | Segall et al. | |
| 2015/0088397 A1 | 3/2015 | Burton | |

(Continued)

FOREIGN PATENT DOCUMENTS

CN   110281955 B   12/2020

OTHER PUBLICATIONS

International Search Report for Application No. PCT/EP2022/079113 dated Mar. 6, 2023 (5 pages).

(Continued)

*Primary Examiner* — Ian Jen
(74) *Attorney, Agent, or Firm* — Michael Best & Friedrich LLP

(57) ABSTRACT

Systems and methods for testing a hands-off detection algorithm. The method includes determining a plurality of system behavior test conditions for the algorithm and selecting an orthogonal array defining a plurality of test cases based on the plurality of system behavior test conditions. The method includes generating, for each of the test cases, an expected test outcome. The method includes for each of the test cases, conducting a test of with the vehicle based on the orthogonal array to generate a plurality of actual test outcomes and generating a response table based on the test outcomes, including a plurality of system behavior test condition interactions. The method includes determining, for each of the interactions, a result rating based on the expected test outcomes and the actual test outcomes and identifying, within the response table, which one or more of the test conditions exhibits a high failure condition.

20 Claims, 8 Drawing Sheets

(56) References Cited

U.S. PATENT DOCUMENTS

| | | |
|---|---|---|
| 2018/0354501 A1 | 12/2018 | Kaufmann et al. |
| 2020/0216079 A1 | 7/2020 | Mahajan |
| 2020/0250057 A1 | 8/2020 | Lim et al. |
| 2020/0346656 A1 | 11/2020 | Fredman |
| 2020/0353970 A1 | 11/2020 | Tardy-Tuch et al. |
| 2020/0353978 A1 | 11/2020 | Hwang et al. |
| 2021/0024075 A1 | 1/2021 | Eigel et al. |

OTHER PUBLICATIONS

Jiansen et al., "Suspension K&C Characteristics and the Effect on Vehicle Steering," International Conference on Computer, Mechatronics, Control and Electronic Engineering (CMCE), 2010, pp. 408-411.

* cited by examiner

Hands off Detection SBT Variables - Spring / Summer / Fall

| Variable | Level-1 | Level-2 | Level-3 | Level-4 | Level-5 | Level-6 |
|---|---|---|---|---|---|---|
| Road Type/Condition | Smooth/Dry | Smooth/Wet | Rough/Dry | Rough/Wet | Smooth/Dry | Rough/Dry |
| Tire Out of Balance | In Balance | Out by 1.5 oz | Out by 3 oz | | | |
| Tire Pressure | Nominal | -10psi | +10psi | | | |
| Ambient Temp | <= 50F | <= 50F | >= 80F | | | |
| Vehicle Speed | 1 mph | 55 mph | 90 mph | | | |
| Initial Hands on Wheel | 1.5 @ 0.05N | 1.5 @ 0.1N | 1.5 @ 0.5N | | | |
| Vehicle Weight | UN R79 Spec | Empty | | | | |

FIG. 4A

Hands off Detection SBT Variables - Winter

| Variable | Level-1 | Level-2 | Level-3 | Level-4 | Level-5 | Level-6 |
|---|---|---|---|---|---|---|
| Road Type/Condition | Smooth/Dry | Smooth/Wet | Rough/Dry | Rough/Wet | Smooth/Snow | Smooth/Dry |
| Temperature | <=32 | <=32 | <=32 | <=32 | <=0 | <=0 |
| Tire Out of Balance | In Balance | Out by 1.5 oz | Out by 3 oz | | | |
| Tire Pressure | Nominal | -10psi | +10psi | | | |
| Vehicle Speed | 1 mph | 55 mph | 90 mph | | | |
| Initial Hands on Wheel | 1.5 @ 0.05N | 1.5 @ 0.1N | 1.5 @ 0.5N | | | |
| Vehicle Weight | UN R79 Spec | Empty | | | | |

HANDS-OFF DETECTION FOR AUTONOMOUS AND PARTIALLY AUTONOMOUS VEHICLES

BACKGROUND OF THE INVENTION

Modern vehicles, including those capable of autonomous driving, include partially autonomous driver assistance systems, for example, lane keeping assistance, adaptive cruise-control, collision mitigation, self-parking, and the like. Some vehicles require a human driver to maintain a level of control over the vehicle, even in a fully autonomous operating mode, by, for example, keeping their hands-on the steering wheel. In order to ensure compliance with such requirements, some vehicles analyze sensed values from the steering system to automatically detect when a driver has removed his hands from the steering wheel.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 4A is a table illustrating aspects of the execution of the method of FIG. 3, in accordance with some embodiments.

FIG. 4B is a table illustrating aspects of the execution of the method of FIG. 3, in accordance with some embodiments.

FIG. 5 is a table illustrating aspects of the execution of the method of FIG. 3, in accordance with some embodiments.

Figure 1:
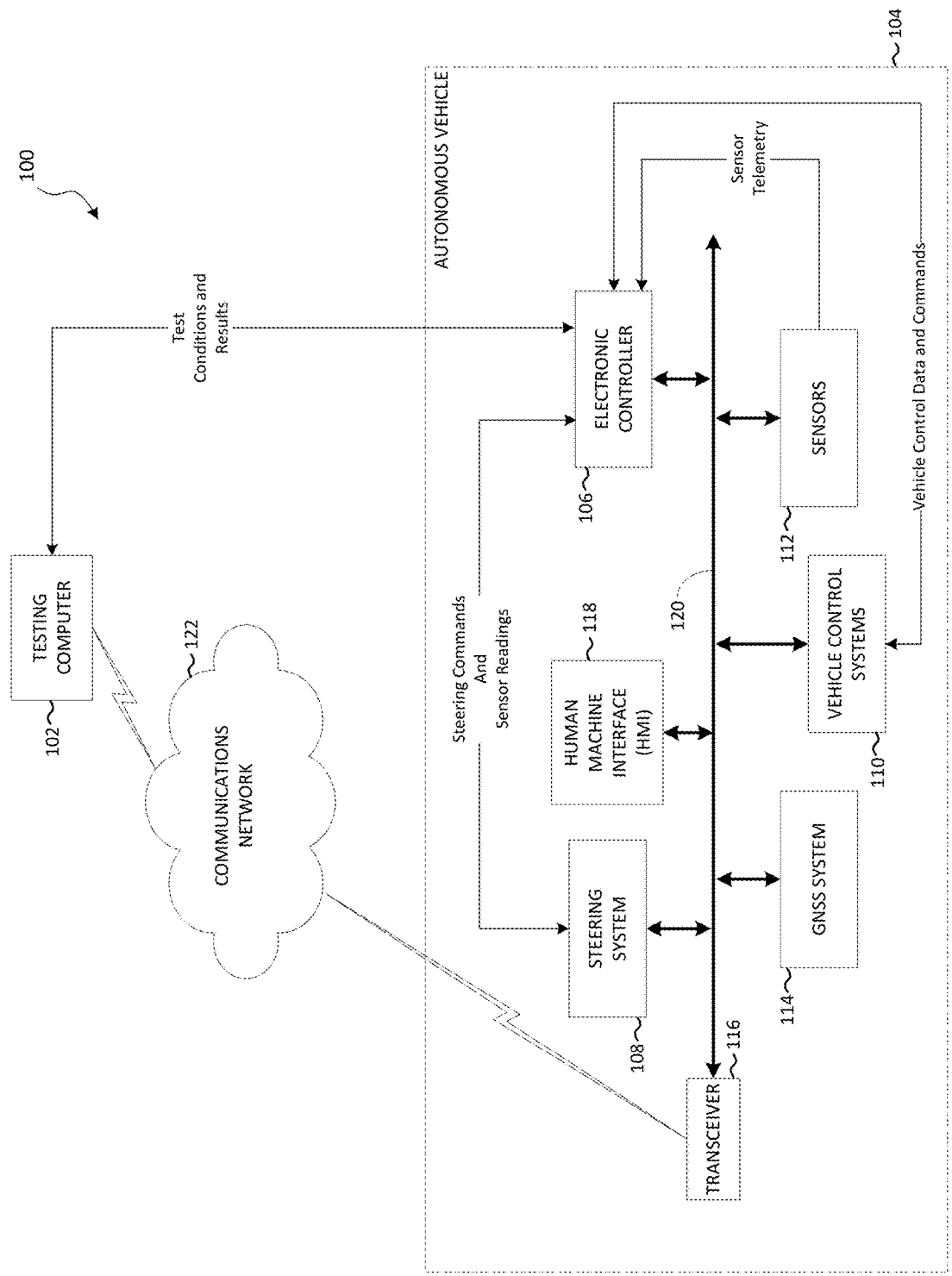
FIG. 1 is a block diagram of a hands-off detection algorithm testing system, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Vehicles capable of autonomous driving, include those providing partially autonomous driver assistance systems, may still require a human driver to maintain a minimum level of control over the vehicle by, for example, keeping their hands-on a steering wheel. In some partially autonomous functions, (for example, highly automated parking) a driver must release the steering wheel in order for the function to operate effectively. In both cases, the vehicle may automatically determine whether the driver's hands are on or off the steering wheel. In order to ensure compliance with such requirements, some vehicles analyze sensed values from the steering system to automatically detect when a driver has removed his hands from the steering wheel. This capability is known as "Hands-off Detection" (HOD).

Hands-off detection is performed by vehicle control systems by monitoring steering torque, steering angle, and/or other aspects of the vehicle's steering system to infer whether a driver is grasping the steering wheel. Some vehicles provide hands-off detection algorithms, which continuously or periodically monitor the steering system and make either a hands-off or hands-on determination. The hands-off detection algorithm is be executed by an electronic control unit on the vehicle, which provides a "hands-on" or "hands-off" indication to other vehicle systems, for example, via a Controller Area Network (CAN™) bus.

As vehicles become more complex, manufacturer requirements for accurately testing features have increased. Hands-off detection algorithms take into account vehicle steering system conditions, but vehicle usage and conditions have not been fully defined in such algorithms. Incomplete testing of hands-off detection can lead to algorithms producing false negative results (for example, not detecting hands-off) or false positive results (for example, detecting hands-off when driver is engaged to the steering system). These errors lead to quality issues and complaints from manufactures as well as end user customers, decreasing overall satisfaction. Testing must capture both these types of problems to ensure effective vehicle application.

Embodiments presented herein address these problems using system behavior testing to allow a minimum number of tests to be run while providing a broad coverage of vehicle usage conditions to detect any issues with the system. Providing broad coverage in testing of all vehicle usage conditions leads to reduced determination errors, which in turn increases the quality of the steering system performance for the vehicle. Using embodiments presented herein, tests can sweep a variety of vehicle usage and environmental conditions to discover problems due to interactions between these variables. Such embodiments reduce the number of required tests by orders of magnitude, but still provide effective testing of the hands-off detection algorithm across a large variety of conditions.

Using such embodiments, failure conditions are quickly identified, and corrective actions are taken to improve the hands-off detection algorithm. In some embodiments, testing, identification, and correction are iterated until an array is produced that correctly recognizes a hands-off detection in all cases. The results of the array can then be implemented in the vehicle's control systems to improve hands-off detection. Such improvements are impractical using conventional testing.

One example embodiment provides a method for testing a hands-off detection algorithm for a vehicle. The method includes determining a plurality of system behavior test conditions for the hands-off detection algorithm based on the vehicle. The method includes selecting an orthogonal array defining a plurality of hands-off detection test cases based on the plurality of system behavior test conditions. The method includes generating, for each of the plurality of hands-off detection test cases, an expected test outcome. The method includes for each of the plurality of hands-off detection test cases, conducting a test of the hands-off detection algorithm with the vehicle based on the orthogonal array to generate a plurality of actual test outcomes. The method includes generating a response table based on the plurality of actual test outcomes. The response table includes a plurality of system behavior test condition interactions. The method includes determining, for each of the plurality of system behavior test condition interactions, a result rating based on the expected test outcomes for the plurality of hands-off detection test cases and the plurality of actual test outcomes. The method includes identifying, within the response table and based on the result rating for each of the plurality of system behavior test condition interactions, which one or more of the plurality of system behavior test conditions exhibits a high failure condition.

Another example embodiment provides a system for testing a hands-off detection algorithm for a vehicle. The system includes an electronic processor. The electronic processor is configured to determine a plurality of system behavior test conditions for the hands-off detection algorithm based on the vehicle. The electronic processor is configured to select an orthogonal array defining a plurality of hands-off detection test cases based on the plurality of system behavior test conditions. The electronic processor is configured to generate, for each of the plurality of hands-off detection test cases, an expected test outcome. The electronic processor is configured to receive a plurality of actual test outcomes generated by conducting, for each of the plurality of hands-off detection test cases, a test of the hands-off detection algorithm with the vehicle based on the orthogonal array. The electronic processor is configured to generate a response table based on the plurality of actual test outcomes. The response table includes a plurality of system behavior test condition interactions. The electronic processor is configured to determine, for each of the plurality of system behavior test condition interactions, a result rating based on the expected test outcomes for the plurality of hands-off detection test cases and the plurality of actual test outcomes. The electronic processor is configured to identify, within the response table and based on the result rating for each of the plurality of system behavior test condition interactions, which one or more of the plurality of system behavior test conditions exhibits a high failure condition.

Another example embodiment provides a non-transitory computer-readable medium including instructions executable by an electronic processor to perform a set of functions. The set of functions includes determining a plurality of system behavior test conditions for the hands-off detection algorithm based on the vehicle. The set of functions includes selecting an orthogonal array defining a plurality of hands-off detection test cases based on the plurality of system behavior test conditions. The set of functions includes generating, for each of the plurality of hands-off detection test cases, an expected test outcome. The set of functions also includes receiving a plurality of actual test outcomes generated by conducting, for each of the plurality of hands-off detection test cases, a test of the hands-off detection algorithm with the vehicle based on the orthogonal array. The set of functions includes generating a response table based on the plurality of actual test outcomes, the response table including a plurality of system behavior test condition interactions. The set of functions also includes determining, for each of the plurality of system behavior test condition interactions, a result rating based on the expected test outcomes for the plurality of hands-off detection test cases and the plurality of actual test outcomes. The set of functions also includes identifying, within the response table and based on the result rating for each of the plurality of system behavior test condition interactions, which one or more of the plurality of system behavior test conditions exhibits a high failure condition.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Also, it is to be understood that the phraseology and terminology used herein is for the purpose of description and should not be regarded as limiting. The terms "mounted," "connected" and "coupled" are used broadly and encompass both direct and indirect mounting, connecting, and coupling. Further, "connected" and "coupled" are not restricted to physical or mechanical connections or couplings, and can include electrical connections or couplings, whether direct or indirect. Also, electronic communications and notifications may be performed using any known means including wired connections, wireless connections, etc.

It should also be noted that a plurality of hardware and software based devices, as well as a plurality of different structural components may be utilized to implement the invention. It should also be noted that a plurality of hardware and software based devices, as well as a plurality of different structural components may be used to implement the invention. In addition, it should be understood that embodiments of the invention may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (for example, stored on non-transitory computer-readable medium) executable by one or more processors. As a consequence, it should be noted that a plurality of hardware and software based devices, as well as a plurality of different structural components may be utilized to implement the invention. For example, "control units" and "controllers" described in the specification can include one or more electronic processors, one or more memory modules including non-transitory computer-readable medium, one or more input/output interfaces, and various connections (for example, a system bus) connecting the components. It should be understood that although certain drawings illustrate hardware and software located within particular devices, these depictions are for illustrative purposes only. In some embodiments, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links.

For ease of description, some or all of the example systems presented herein are illustrated with a single exemplar of each of its component parts. Some examples may not describe or illustrate all components of the systems. Other example embodiments may include more or fewer of each of the illustrated components, may combine some components, or may include additional or alternative components.

FIG. 1 is a block diagram of one example embodiment of a system 100 for testing hands-off detection algorithms used in vehicle control systems, for example, those found in autonomous vehicles. It should be noted that, in the description that follows, the term "autonomous vehicle" should not be considered limiting. The systems and methods described herein may be used with autonomous vehicles, partially autonomous vehicles, and conventional non-autonomous motor vehicles. The term "autonomous vehicle" is used in an inclusive way to refer to an autonomous or partially autonomous motor vehicle, which possesses varying degrees of automation (that is, the vehicle is configured to drive itself with limited, or in some cases no, input from a driver). In should also be noted that the term "driver," as used herein, generally refers to an occupant of an autonomous vehicle, who operates the controls of the vehicle or provides control input to the vehicle to influence the autonomous or partially-autonomous operation of the vehicle.

In the example illustrated, the system 100 includes a testing computer 102 and the vehicle 104. As described in detail herein, in some embodiments, the testing computer 102 and systems of the vehicle exchange commands and data to perform tests on aspects of the control systems of the vehicle 104, in particular, hands-off detection algorithms.

In some embodiments, the testing computer 102 is a computer server including at least an electronic processor, a memory, and a communication interface. As described in detail herein, in some embodiments the testing computer 102 operates to receive and analyze hands-off detection algorithm test data from the vehicle 104. In some embodiments, the testing computer 102 uses one or more machine learning methods to analyze test data to train hands-off detection algorithms to reduce false negative and false positive determinations. Machine learning generally refers to the ability of a computer program to learn without being explicitly programmed. In some embodiments, a computer program (for example, a learning engine) is configured to construct an algorithm based on inputs. Supervised learning involves presenting a computer program with example inputs and their desired outputs. The computer program is configured to learn a general rule that maps the inputs to the outputs from the training data it receives. Example machine learning engines include decision tree learning, association rule learning, artificial neural networks, classifiers, inductive logic programming, support vector machines, clustering, Bayesian networks, reinforcement learning, representation learning, similarity and metric learning, sparse dictionary learning, and genetic algorithms. Using these approaches, a computer program can ingest, parse, and understand data and progressively refine algorithms for data analytics.

In the example embodiment illustrated in FIG. 1, the vehicle 104 is an autonomous vehicle that includes an electronic controller 106, a steering system 108, vehicle control systems 110, vehicle sensors 112, a GNSS (global navigation satellite system) system 114, a transceiver 116, and a human machine interface (HMI) 118. The components of the vehicle 104, along with other various modules and components are electrically and communicatively coupled to each other by or through one or more control or data buses (for example, the bus 120), which enable communication therebetween. The use of control and data buses for the interconnection between, and communication among, the various modules and components would be known to a person skilled in the art in view of the invention described herein. In some embodiments, the bus 120 is a Controller Area Network (CAN™) bus. In some embodiments, the bus 120 is an automotive Ethernet™, a FlexRay™ communications bus, or another suitable wired bus. In alternative embodiments, some or all of the components of the vehicle 104 may be communicatively coupled using suitable wireless modalities (for example, Bluetooth™ or near field communication).

The electronic controller 106 (described more particularly below with respect to FIG. 2) operates with the steering system 108, the vehicle control systems 110 and the sensors 112 to autonomously control the vehicle. The electronic controller 106 receives sensor telemetry from the sensors 112 and determines path data (for example, vehicle trajectories) and other control commands for the vehicle 104. The electronic controller 106 transmits the vehicle path data and control commands to, among other things, the steering system 108 and the vehicle control systems 110 to drive the vehicle (for example, by generating braking signals, acceleration signals, steering signals). In some embodiments, the electronic controller 106 implements partially autonomous control of the vehicle 104 (for example, adaptive cruise control, lane keeping assistance, lane centering assistance, highly automated parking, and the like).

The steering system 108 is configured to direct the vehicle 104 by moving steering components connected to a front axle of the vehicle 104 based on a steering command (for example, a movement of a steering wheel of the steering system 108 by a driver or a command from the electronic controller 106). The steering system 108 includes sensors for measuring steering torque (for example, the torque force being applied to the steering wheel), steering angle, and steering angular speed. These measurements are reported to the electronic controller 106, which uses one or more of the measurements to, among other things, detect a hands-off condition using a hands-off detection algorithm as described herein.

The vehicle control systems 110 include controllers, sensors, actuators, and the like for controlling aspects of the operation of the vehicle 104 (for example, acceleration, braking, shifting gears, and the like). The vehicle control systems 110 are configured to send and receive data relating to the operation of the vehicle 104 to and from the electronic controller 106.

The sensors 112 determine one or more attributes of the vehicle and its surrounding environment and communicate information regarding those attributes to the other components of the vehicle 104 using, for example, electrical signals. The sensors 112 may include, for example, vehicle control sensors (for example, sensors that detect accelerator pedal position and brake pedal position, wheel speed sensors, vehicle speed sensors, yaw sensors, force sensors, odometry sensors, and vehicle proximity sensors (for example, camera, radar, LIDAR, and ultrasonic). In some embodiments, the sensors 112 include one or more cameras or other imaging devices configured to capture one or more images of the environment surrounding the vehicle 104.

In some embodiments, the vehicle 104 includes, in addition to the sensors 112, a GNSS (global navigation satellite system) system 114 The GNSS system 114 receives radiofrequency signals from orbiting satellites using one or more antennas and receivers (not shown). The GNSS system 114 determines geo-spatial positioning (for example, latitude, longitude, altitude, and speed) for the vehicle based on the received radiofrequency signals. The GNSS system 114 communicates this positioning information to the electronic controller 106. The electronic controller 106 may use this information in conjunction with or in place of information received from some of the sensors 112 when autonomously controlling the vehicle 104.

The transceiver 116 includes a radio transceiver communicating data over one or more wireless communications networks (for example, cellular networks, satellite networks, land mobile radio networks, etc.) including the communications network 122. The communications network 122 is a communications network including wireless connections, wired connections, or combinations of both. The communications network 122 may be implemented using a wide area network, for example, the Internet (including public and private IP networks), a Long Term Evolution (LTE) network, a 3G network, a 4G network, 5G network and one or more local area networks, for example, a Bluetooth™ network or Wi-Fi™ network, and combinations or derivatives thereof.

The transceiver 116 also provides wireless communications within the vehicle using suitable network modalities. Accordingly, the transceiver 116 communicatively couples the electronic controller 106 and other components of the vehicle 104 with networks or electronic devices both inside and outside the vehicle 104. For example, the electronic controller 106, using the transceiver 116, can communicate with the testing computer 102 to send and receive data, commands, and other information (for example, testing conditions and results).

In some embodiments, the electronic controller 106 controls aspects of the operation of the vehicle 104 based on commands received from the human machine interface (HMI) 118. The HMI 118 provides an interface between the components of the vehicle 104 and a driver of the vehicle 104. The HMI 118 is configured to receive input from the driver, receive indications of vehicle status from the system's controllers (for example, the electronic controller 106), and provide information to the driver based on the received indications. The HMI 118 provides visual output, such as, for example, graphical indicators (for example, fixed or animated icons), lights, colors, text, images, combinations of the foregoing, and the like. The HMI 118 includes a suitable display mechanism for displaying the visual output, such as, for example, an instrument cluster, a mirror, a heads-up display, a center console display screen (for example, a liquid crystal display (LCD) touch screen, or an organic light-emitting diode (OLED) touch screen), or other suitable display mechanisms. In alterative embodiments, the display screen may not be a touch screen. In some embodiments, the HMI 118 displays a graphical user interface (GUI) (for example, generated by the electronic controller and presented on a display screen) that enables a driver or passenger to interact with the autonomous vehicle 104. The HMI 118 may also provide audio output to the driver such as a chime, buzzer, voice output, or other suitable sound through a speaker included in the HMI 118 or separate from the HMI 118. In some embodiments, HMI 118 provides haptic outputs to the driver by vibrating one or more vehicle components (for example, the vehicle's steering wheel and the seats), for example, using a vibration motor. In some embodiments, HMI 118 provides a combination of visual, audio, and haptic outputs.

Figure 2:
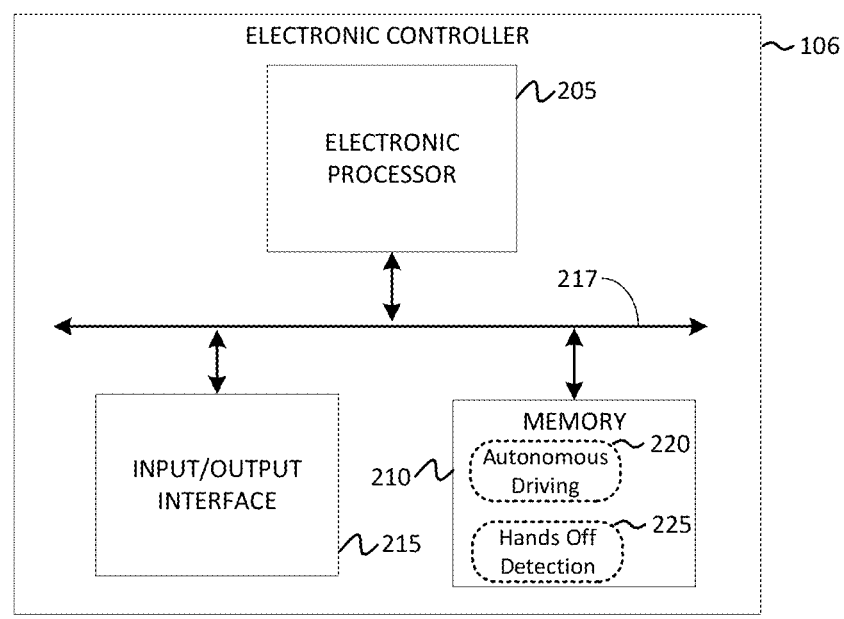
FIG. 2 schematically illustrates an electronic controller of the system of FIG. 1, in accordance with some embodiments.

FIG. 2 illustrates an exemplary embodiment of an electronic controller 106, which includes an electronic processor 205 (for example, a microprocessor, application specific integrated circuit, etc.), a memory 210, and an input/output interface 215. The memory 210 may be made up of one or more non-transitory computer-readable media and includes at least a program storage area and a data storage area. The program storage area and the data storage area can include combinations of different types of memory, such as read-only memory ("ROM"), random access memory ("RAM"), electrically erasable programmable read-only memory ("EEPROM"), flash memory, or other suitable memory devices. The electronic processor 205 is coupled to the memory 210 and the input/output interface 215 (for example, via a control and data bus 217). The electronic processor 205 sends and receives information (for example, from the memory 210 and/or the input/output interface 215) and processes the information by executing one or more software instructions or modules, capable of being stored in the memory 210, or another non-transitory computer readable medium. The software can include firmware, one or more applications, program data, filters, rules, one or more program modules, and other executable instructions. The electronic processor 205 is configured to retrieve from the memory 210 and execute, among other things, software for performing methods as described herein. In the embodiment illustrated, the memory 210 stores, among other things, an autonomous driving engine 220 and a hands-off detection algorithm 225.

The input/output interface 215 transmits and receives information from devices external to the electronic controller 106 (for example, over one or more wired and/or wireless connections), for example, components of the vehicle 104 via the bus 120. The input/output interface 215 receives user input, provides system output, or a combination of both. As described herein, user input from a driver the vehicle 104 may be provided via, for example, the steering system 108 and the HMI 118. The input/output interface 215 may also include other input and output mechanisms, which for brevity are not described herein and which may be implemented in hardware, software, or a combination of both.

It should be understood that although FIG. 2 illustrates only a single electronic processor 205, memory 210, and input/output interface 215, alternative embodiments of the electronic controller 106 may include multiple processing units, memory modules, and/or input/output interfaces. It should also be noted that the vehicle 104 may include other electronic controllers, each including similar components as, and configured similarly to, the electronic controller 106. In some embodiments, the electronic controller 106 is implemented partially or entirely on a semiconductor (for example, a field-programmable gate array ["FPGA"] semiconductor) chip. Similarly, the various modules and controllers described herein may be implemented as individual controllers, as illustrated, or as components of a single controller. In some embodiments, a combination of approaches may be used.

Figure 3:
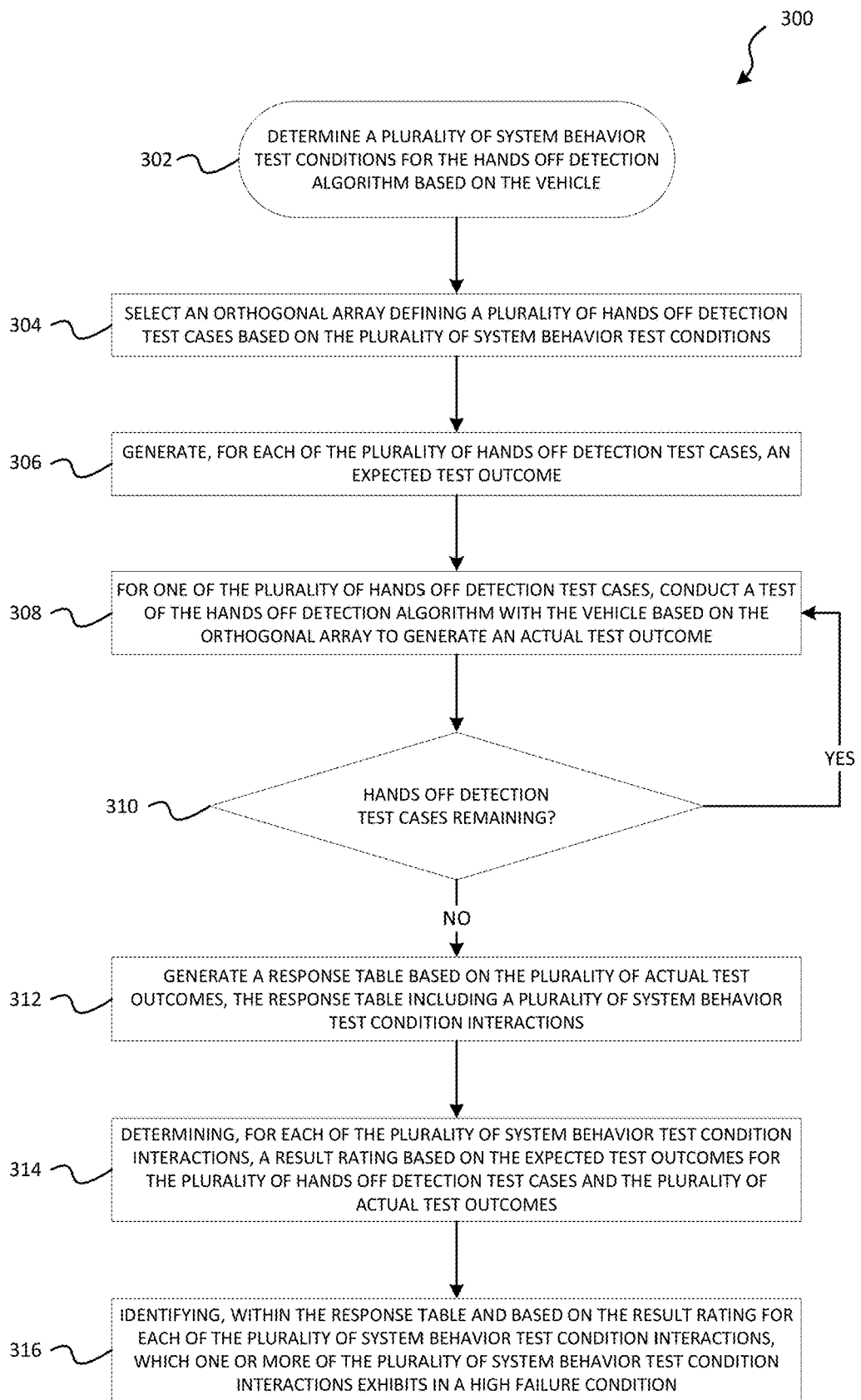
FIG. 3 is a flow chart of a method for performing hands-off detection algorithm testing for a vehicle, in accordance with some embodiments.

As noted, certain autonomous or partially autonomous functions of autonomous vehicles require a driver to have his or her hands on the steering wheel. Such functions may not activate or may terminate when a hands-off state is detected. False positive or false negative results for hands-off detection may lead to inefficient operation of the vehicle and result in driver annoyance. Accordingly, FIG. 3 illustrates an example method 300 for testing hands-off detection algorithms used by such vehicles (for example, the hands-off detection algorithm 225 of the vehicle 104). Although the method 300 is described in conjunction with the system 100 as described herein, the method 300 could be used with other systems and vehicles. In addition, the method 300 may be modified or performed differently than the specific example provided. By way of example, the method 300 is described as being performed in part by the testing computer 102. However, it should be understood that in some embodiments, portions of the method 300 may be performed in other ways or by or with other devices (for example, the electronic controller 106).

At block 302, the testing computer 102 determines a plurality of system behavior test conditions for the hands-off detection algorithm based on the vehicle. System behavior test conditions can be characteristics of the environment in which the vehicle 104 is operating, characteristics of the vehicle 104, an operational status of the vehicle 104, a hands-on condition, and the like. FIG. 4A presents a table 402, which includes a number of system behavior test conditions (referred to in the table 402 as variables 403). As illustrated in FIG. 4A, each of the system behavior test conditions may have two or more state values 405. One example of a system behavior test condition is a road type/conditions (for example, whether the road surface is smooth or rough, dry or wet, snowy, etc.). Another example of a system behavior test condition is tire balance (for example, whether one or more tires on the vehicle are in balance or out of balance by a particular amount). Another example of a system behavior test condition is a tire pressure (for example, whether the tire pressure is too high, too low, or nominal for the vehicle being tested). Another example of a system behavior test condition is an ambient temperature or ambient temperature range (for example, above or below freezing, above 80F, etc.). Another example of a system behavior test condition is vehicle speed at the time of testing (for example, expressed in terms of an absolute speed or a range). Another example of a system behavior test condition is an initial hands-on wheel value (for example, for how long and at what force hands are applied to the steering wheel prior to each testing phase). Another example of a system behavior test condition is a vehicle weight (for example, whether the vehicle is empty or is loaded, either according to a testing standard or an absolute weight value). The table 402 presents an example group of system behavior test conditions and potential state values useful for testing during the spring, summer, or fall seasons. As illustrated in FIG. 4B, which presents a table 404, different state values may be evaluated during a winter test.

Returning to FIG. 3, at block 304, the testing computer 102 selects an orthogonal array defining a plurality of hands-off detection test cases based on the plurality of system behavior test conditions. For example, as illustrated in table 500 of FIG. 5, an orthogonal array is presented in columns A through G, representing eighteen hands-off detection test cases 1 through 18 (presented in detail in table 502). As illustrated in the table 502, each of the plurality of hands-off detection test cases includes a state value for each of the plurality of system behavior test conditions.

In some embodiments, the method 300 includes modifying the orthogonal array by adjusting a degree of freedom for the orthogonal array based on a desired granularity level for the test. For example, providing more than eighteen hands-off detection test cases will provide for more possible interactions between the variables.

Figure 5:
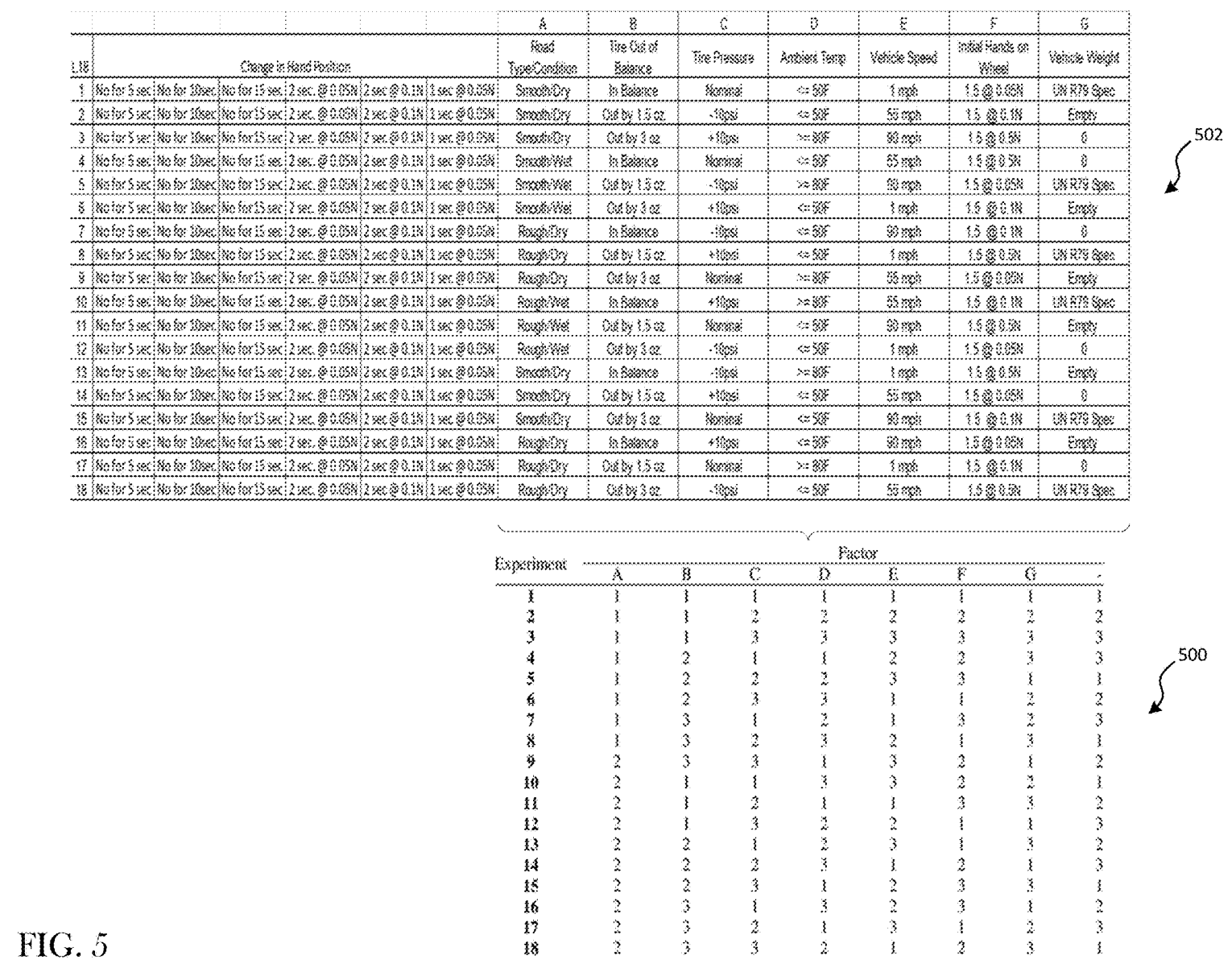

Returning to FIG. 3, at block 306 the testing computer 102 generates, for each of the plurality of hands-off detection test cases, an expected test outcome. For example, as illustrated in FIG. 5, six tests (three with hands-on and three with hands-off) will be performed for each hands-off detection test case. The expected results (for example, hands-on detected or hands-off detected) for each test of each test case are determined.

At block 308, for one of the plurality of hands-off detection test cases, a test of the hands-off detection algorithm is performed with the vehicle. For example, a driver operates the vehicle according to the state values for the hands-off detection test case. For example, for hands-off detection test case 1 (see FIG. 5), the vehicle 104 is driven at 1 mph on a smooth and dry road at an ambient temperature under 50F. The tires are in balance and have nominal pressure. The vehicle weight complies with the UNR79 specification and the test commences with the driver's hands exerting 0.5N of force on the steering wheel for 1.5 seconds. Under these conditions, the driver operates the vehicle and performs six tests. Three of the tests are performed during hands-off time periods and three of the tests are performed during hands-on time periods. In one test, the driver's hands are removed from the steering wheel for 5 s. In a second test, the driver's hands are removed from the steering wheel for 10 s. In a third test, the driver's hands are removed from the steering wheel for 15 s. In a fourth test, driver's hands exert 0.05N of force on the steering wheel for 2 s. In a fifth test, driver's hands exert 0.1N of force on the steering wheel for 2 s. In a sixth test, driver's hands exert 0.05N of force on the steering wheel for 1 s. For each of the hands-off time periods and hands-on time periods, the output of the hands-off detection algorithm is recorded (for example, transmitted to the testing computer 102 by the electronic controller 106 via the transceiver 116). These outputs represent a plurality of actual test outcomes.

At block 310, if hands-off detection test cases of the plurality of hands-off detection test cases remain to be tested, the next ands off detection test case in the orthogonal array is performed (at block 308).

Figure 6:
FIG. 6 is a table illustrating aspects of the execution of the method of FIG. 3, in accordance with some embodiments.
Figure 7:
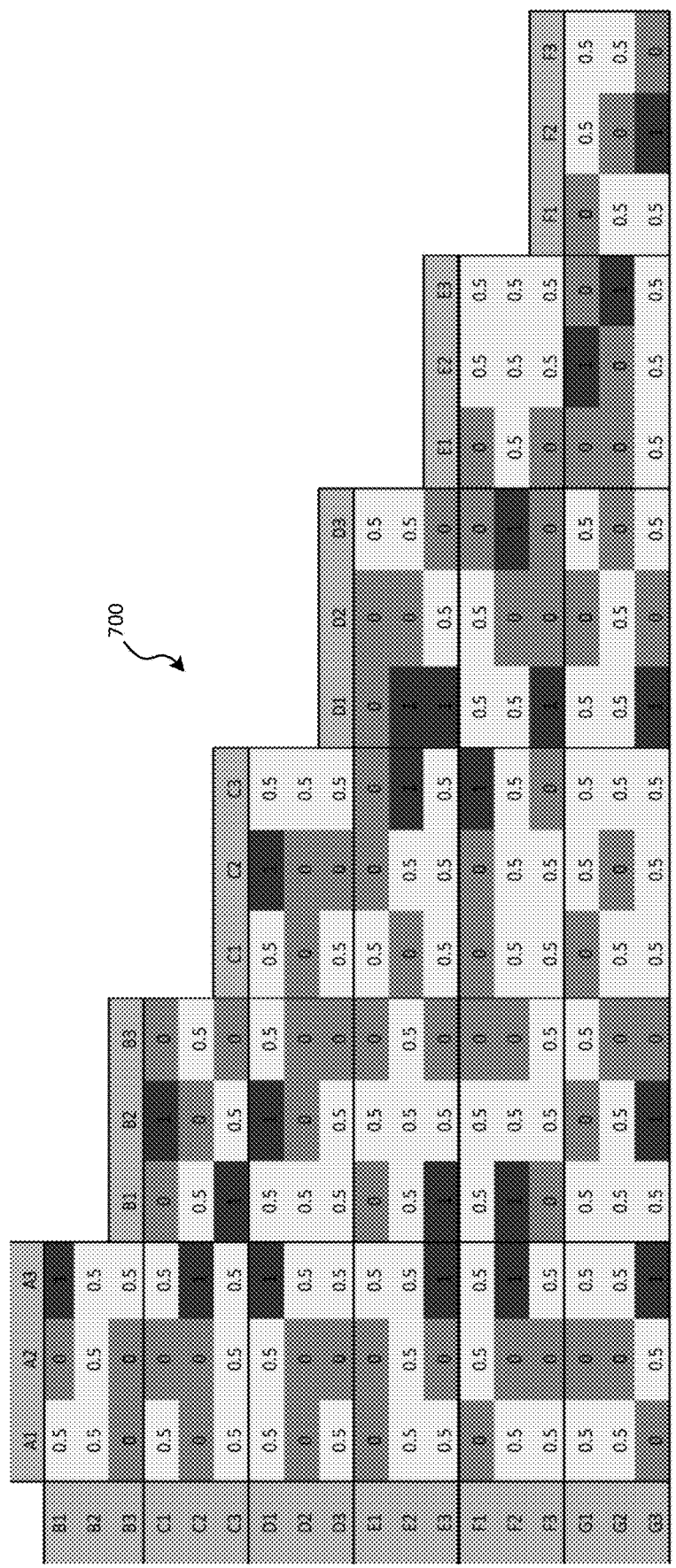
FIG. 7 is a table illustrating aspects of the execution of the method of FIG. 3, in accordance with some embodiments.

After all tests have been completed (at block 310), the testing computer 102 generates a response table based on the plurality of actual test outcomes (at block 312). An example data set for a plurality of actual test outcomes is presented in the table 600 of FIG. 6. Using the plurality of actual test outcomes, a response table is generated that includes a plurality of system behavior test condition interactions. An example response table 700 is illustrated in FIG. 7. Each of the plurality of system behavior test condition interactions is associated with two distinct system behavior test conditions of the plurality of system behavior test conditions, each having a state value. The system behavior test condition interactions are determined by the orthogonal array, as described above. Each of these system behavior test condition interactions represents a test (for example, a hands-off detection test case performed for a particular hands-off or hands-on time period) where the two condition/state value combinations were in effect. As illustrated in the table 700, each possible interaction is presented once and represented by one cell in the table 700.

Returning to FIG. 3, at block 314, the testing computer 102 determines, for each of the plurality of system behavior test condition interactions, a result rating based on the expected test outcomes for the plurality of hands-off detection test cases and the plurality of actual test outcomes (for example, by comparing those of the plurality of actual test outcomes generated for the hands-off detection test case to the expected test outcomes for the hands-off detection test case). In the example illustrated, where the test passed (for example, the hands-off or hands-on condition was determined correctly by the hands-off detection algorithm) for all instances of that system behavior test condition interaction, that interaction is assigned a result rating of 0. Where the test failed (for example, the hands-off or hands-on condition was determined incorrectly by the hands-off detection algorithm) for all instances of that system behavior test condition interaction, that interaction is assigned a result rating of 1. Where the test failed for some instances of that system behavior test condition interaction, but passed for others, that interaction is assigned a result rating of 0.5.

At block 316, the testing computer 102 identifies, within the response table and based on the result rating for each of the plurality of system behavior test condition interactions, which one or more of the plurality of system behavior test conditions exhibits a high failure condition. A high failure condition is label, which indicates that it is likely that the system behavior condition so labeled contributes to testing failures for the hands-off detection algorithm. For example, as illustrated in table 700, test failures are indicated by a 1. In some embodiments, the number of failures (1s) is used to determine whether the system behavior test conditions exhibits a high failure condition. In one example, a high failure condition is determined using an absolute threshold (for example, where three or more failures indicate high failure condition). In that example, the testing computer 102 may determine, based on the results presented in table 700, that the system behavior test conditions corresponding to A3, B1, B2, D1, E3, F2, and G3 exhibit high failure conditions. In another example, a high failure condition is determined as a relative value indicative of how much higher one system behavior test condition failure rate is from the next nearest system behavior test condition failure rate, or above a median or average failure rate for all system behavior test condition that indicate failures. In another example, a high failure condition is determined only for those system behavior test conditions that exhibit the highest number of failures. In that example, the testing computer 102 may determine, based on the results presented in table 700, that only the system behavior test condition corresponding to A3 would be labeled as exhibiting a high failure condition.

In some embodiments, system behavior test conditions exhibiting a high failure condition may be used to adjust the hands-off detection algorithm to generate an adjusted hands-off detection algorithm. For example, the portions of the algorithm that incorporate sensor data or make determinations based on those conditions (for example, tire pressure, wheel speed, etc.) may be analyzed or re-programmed to address the failure rates. In another example, the response table or portions thereof may be used as training data for a machine learning hands-off detection algorithm to re-train the algorithm.

Figure 8:
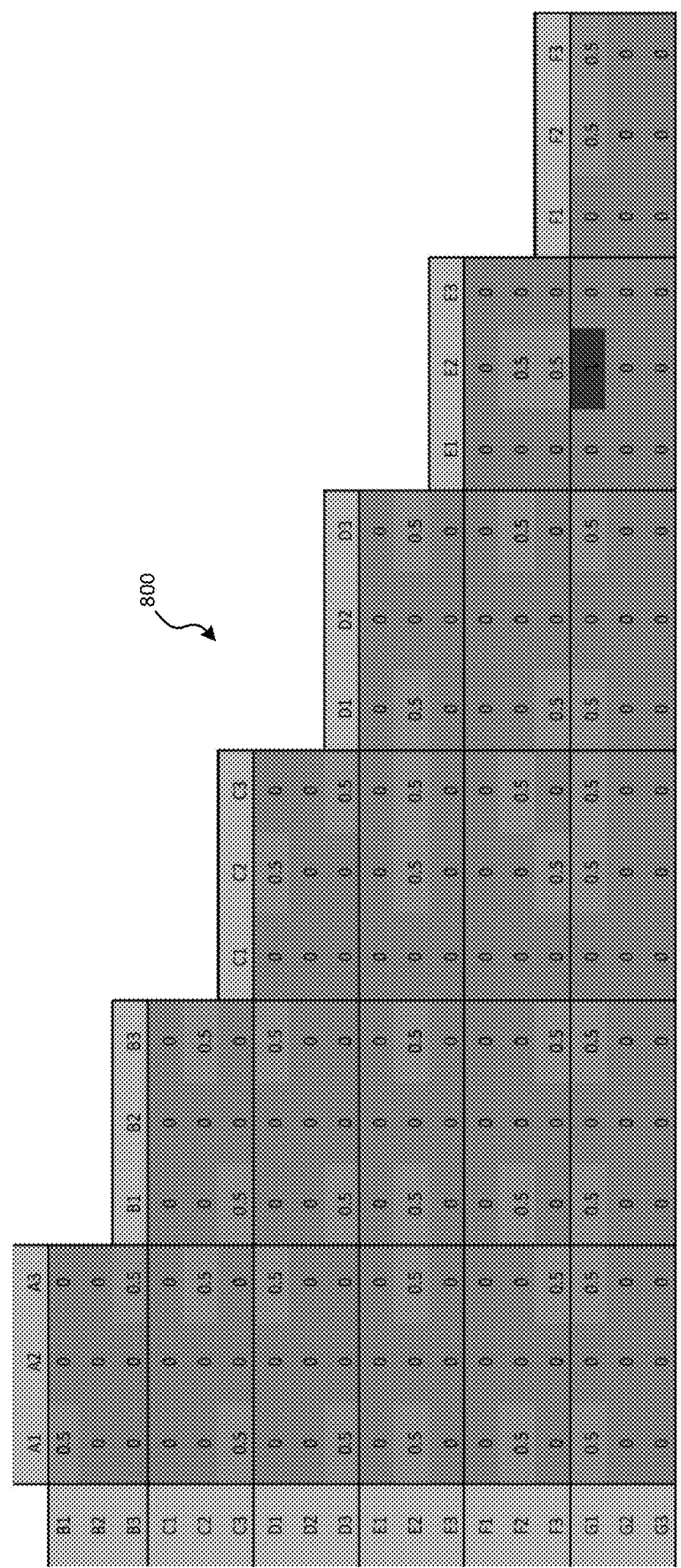
FIG. 8 is a table illustrating aspects of the execution of the method of FIG. 3, in accordance with some embodiments.

In some embodiments, the vehicle 104 is configured with the adjusted hands-off detection algorithm and the method 300 is performed iteratively. For example, a second pass of the method 300 on an adjusted hands-off detection algorithm tuned based on the response table 700 may yield an improved response (as illustrated in the table 800 of FIG. 8). In some embodiments, the method 300 is performed iteratively until the improved test results are acceptable. In some embodiments, the method 300 may be performed with successive adjusted hands-off detection algorithms until an algorithm is developed that passes in all test cases.

Thus, the embodiments presented herein provide, among other things, systems and methods for testing hands-off detection algorithms for autonomous and partially autonomous vehicles. The results of the tests can then be implemented in a vehicle's control systems to improve hands-off detection. Such improvements are impractical using conventional testing. For example, to test all possible combinations (using a full factorial) of the conditions described herein would require 4,374 tests to be run 6 times. This would require months of testing to develop a single set of results. Iteratively testing algorithms based on such test results would be nearly impossible, given that automobile models and specifications change from year to year.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

In this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way but may also be configured in ways that are not listed.

Various features, advantages, and embodiments are set forth in the following claims.

What is claimed is:

1. A method for testing a hands-off detection algorithm for a vehicle, the method comprising:
   determining a plurality of system behavior test conditions for the hands-off detection algorithm based on the vehicle;
   selecting an orthogonal array defining a plurality of hands-off detection test cases based on the plurality of system behavior test conditions;
   generating, for each of the plurality of hands-off detection test cases, an expected test outcome;
   for each of the plurality of hands-off detection test cases, conducting a test of the hands-off detection algorithm with the vehicle based on the orthogonal array to generate a plurality of actual test outcomes;
   generating a response table based on the plurality of actual test outcomes, the response table including a plurality of system behavior test condition interactions;
   determining, for each of the plurality of system behavior test condition interactions, a result rating based on the expected test outcomes for the plurality of hands-off detection test cases and the plurality of actual test outcomes; and
   identifying, within the response table and based on the result rating for each of the plurality of system behavior test condition interactions, which one or more of the plurality of system behavior test conditions exhibits a high failure condition.

2. The method of claim 1, further comprising:
adjusting the hands-off detection algorithm to generate an adjusted hands-off detection algorithm based on the one or more of the plurality of system behavior test conditions that exhibit a high failure condition; and
configuring the vehicle with the adjusted hands-off detection algorithm.

3. The method of claim 2, further comprising:
for each of the plurality of hands-off detection test cases, conducting the test of the adjusted hands-off detection algorithm with the vehicle based on the orthogonal array to generate a second plurality of actual test outcomes;
generating a second response table based on the second plurality of actual test outcomes, the second response table including a second plurality of system behavior test condition interactions;
determining, for each of the second plurality of system behavior test condition interactions, a second result rating based on the expected test outcomes for the plurality of hands-off detection test cases and the second plurality of actual test outcomes; and
identifying, within the second response table and based on the second result rating for each of the second plurality of system behavior test condition interactions, which one or more of the second plurality of system behavior test condition interactions exhibits in the high failure condition.

4. The method of claim 1, wherein:
each of the plurality of hands-off detection test cases includes a state value for each of the plurality of system behavior test conditions;
conducting the test of the hands-off detection algorithm with the vehicle includes, for each of the plurality of hands-off detection test cases, operating the vehicle according to the state values for the hands-off detection test case for at least one hands-off time period and at least one hands-on time period; and
generating the plurality of actual test outcomes includes generating an actual test outcome for each of the at least one hands-off time period and the at least one hands-on time period for each of the plurality of hands-off detection test cases.

5. The method of claim 4, wherein the state value for each of the plurality of system behavior test conditions has at least two potential state values.

6. The method of claim 4, wherein:
each of the plurality of system behavior test condition interactions is associated with a first system behavior test condition selected from the plurality of system behavior test conditions and having a first state value, and a second system behavior test condition selected from the plurality of system behavior test conditions and having a second state value, the second system behavior test condition being distinct from the first system behavior test condition; and
determining the result rating for each of the plurality of system behavior test condition interactions includes, for each of the plurality of hands-off detection test cases that include both the first system behavior test condition and the second system behavior test condition, comparing those of the plurality of actual test outcomes generated for the hands-off detection test case to the expected test outcomes for the hands-off detection test case.

7. The method of claim 4, wherein operating the vehicle for at least one hands-off time period includes operating the vehicle without hands-on a steering wheel of the vehicle for a predetermined time period.

8. The method of claim 4, wherein operating the vehicle for at least one hands-on time period includes operating the vehicle by using hands to apply a predetermined force to a steering wheel of the vehicle for a predetermined time period.

9. The method of claim 1, further comprising:
modifying the orthogonal array by adjusting a degree of freedom for the orthogonal array based on a desired granularity level for the test.

10. The method of claim 1, wherein the plurality of system behavior test conditions includes at least two selected from the group consisting of a road type, a road condition, an ambient temperature, a tire balance value, a tire pressure value, a vehicle speed, an initial hands-on wheel value, and a vehicle weight.

11. A system for testing a hands-off detection algorithm for a vehicle, the system comprising:
an electronic processor, configured to:
determine a plurality of system behavior test conditions for the hands-off detection algorithm based on the vehicle;
select an orthogonal array defining a plurality of hands-off detection test cases based on the plurality of system behavior test conditions;
generate, for each of the plurality of hands-off detection test cases, an expected test outcome;
receive a plurality of actual test outcomes generated by conducting, for each of the plurality of hands-off detection test cases, a test of the hands-off detection algorithm with the vehicle based on the orthogonal array;
generate a response table based on the plurality of actual test outcomes, the response table including a plurality of system behavior test condition interactions;
determine, for each of the plurality of system behavior test condition interactions, a result rating based on the expected test outcomes for the plurality of hands-off detection test cases and the plurality of actual test outcomes; and
identify, within the response table and based on the result rating for each of the plurality of system behavior test condition interactions, which one or more of the plurality of system behavior test conditions exhibits a high failure condition.

12. The system of claim 11, wherein the vehicle is configured to operate using an adjusted hands-off detection algorithm based on the hands-off detection algorithm and one or more of the plurality of system behavior test conditions that exhibit a high failure condition; and
the electronic processor is further configured to:
receive a second plurality of actual test outcomes generated by conducting, for each of the plurality of hands-off detection test cases, a test of the hands-off detection algorithm with the vehicle based on the orthogonal array;
generate a second response table based on the second plurality of actual test outcomes, the second response table including a second plurality of system behavior test condition interactions;
determine, for each of the second plurality of system behavior test condition interactions, a second result rating based on the expected test outcomes for the plurality of hands-off detection test cases and the second plurality of actual test outcomes; and identify, within the second response table and based on the second result rating for each of the second plurality of system behavior test condition interactions, which one or more of the second plurality of system behavior test condition interactions exhibits in the high failure condition.

13. The system of claim 11, wherein:
each of the plurality of hands-off detection test cases includes a state value for each of the plurality of system behavior test conditions; and
the plurality of actual test outcomes includes an actual test outcome for each of an at least one hands-off time period and an at least one hands-on time period for each of the plurality of hands-off detection test cases.

14. The system of claim 13, wherein the state value for each of the plurality of system behavior test conditions has at least two potential state values.

15. The system of claim 13, wherein:
each of the plurality of system behavior test condition interactions is associated with a first system behavior test condition selected from the plurality of system behavior test conditions and having a first state value, and a second system behavior test condition selected from the plurality of system behavior test conditions and having a second state value, the second system behavior test condition being distinct from the first system behavior test condition; and
the electronic processor is configured to determine the result rating for each of the plurality of system behavior test condition interactions by, for each of the plurality of hands-off detection test cases that include both the first system behavior test condition and the second system behavior test condition, comparing those of the plurality of actual test outcomes generated for the hands-off detection test case to the expected test outcomes for the hands-off detection test case.

16. The system of claim 13, wherein the at least one hands-off time period includes a time period, during which the vehicle was operated without hands-on a steering wheel of the vehicle for a predetermined time period.

17. The system of claim 13, wherein the at least one hands-on time period includes a time period, during which the vehicle was operated by using hands to apply a predetermined force to a steering wheel of the vehicle for a predetermined time period.

18. The system of claim 11, wherein the electronic processor is further configured to:
modify the orthogonal array by adjusting a degree of freedom for the orthogonal array based on a desired granularity level for the test.

19. The system of claim 11, wherein the plurality of system behavior test conditions includes at least two selected from the group consisting of a road type, a road condition, an ambient temperature, a tire balance value, a tire pressure value, a vehicle speed, an initial hands-on wheel value, and a vehicle weight.

20. A non-transitory computer-readable medium including instructions executable by an electronic processor to perform a set of functions, the set of functions comprising:
determining a plurality of system behavior test conditions for the hands-off detection algorithm based on the vehicle;
selecting an orthogonal array defining a plurality of hands-off detection test cases based on the plurality of system behavior test conditions;
generating, for each of the plurality of hands-off detection test cases, an expected test outcome;
receiving a plurality of actual test outcomes generated by conducting, for each of the plurality of hands-off detection test cases, a test of the hands-off detection algorithm with the vehicle based on the orthogonal array;
generating a response table based on the plurality of actual test outcomes, the response table including a plurality of system behavior test condition interactions;
determining, for each of the plurality of system behavior test condition interactions, a result rating based on the expected test outcomes for the plurality of hands-off detection test cases and the plurality of actual test outcomes; and
identifying, within the response table and based on the result rating for each of the plurality of system behavior test condition interactions, which one or more of the plurality of system behavior test conditions exhibits a high failure condition.

* * * * *